United States Patent [19]

Lange et al.

[11] 3,792,486

[45] Feb. 12, 1974

[54] CAMERA-RADIO COMBINATION

[75] Inventors: Karl-Heinz Lange; Hermann Korber, both of Bunde, Germany

[73] Assignee: Bloda-Werke, Bunde (Westf), Germany

[22] Filed: May 22, 1972

[21] Appl. No.: 255,546

[30] Foreign Application Priority Data

Feb. 7, 1972 Germany .......................... 2205652

[52] U.S. Cl. .................................................. 95/12
[51] Int. Cl. ........................................... G03b 29/00
[58] Field of Search ......................................... 95/12

[56] References Cited

UNITED STATES PATENTS

| | | | |
|---|---|---|---|
| 2,913,971 | 11/1959 | Berkovits | 95/12 |
| 3,246,587 | 4/1966 | Oliver | 95/12 |
| 2,899,881 | 8/1959 | Lopez | 95/12 |

FOREIGN PATENTS OR APPLICATIONS

| | | | |
|---|---|---|---|
| 1,104,822 | 4/1961 | Germany | 95/31 EL |

*Primary Examiner*—John M. Horan
*Attorney, Agent, or Firm*—Blum, Moscovitz, Friedman & Kaplan

[57] ABSTRACT

A camera-radio combination. The combination has a conventional camera provided with a camera housing having in its interior spaces which normally would remain empty. A radio receiver has components situated in these spaces.

10 Claims, 6 Drawing Figures

CAMERA-RADIO COMBINATION

BACKGROUND OF THE INVENTION

The present invention relates to camera-radio combinations.

Combining a radio receiver with a camera is already known, as is shown in German Gebrauchsmuster 1,977,677. For this type of known combination the individual camera components are combined with a separate small radio receiver which in itself forms a complete unit so that the conventional camera only has a small radio attached thereto. Thus, the camera and the small radio receiver unit are simply situated within a common housing.

This type of known construction has considerable disadvantages in that the common housing provided for the camera and radio receiver is undesirably large and cannot be handled comfortably. As a result of these disadvantages such camera-radio combinations have not been manufactured.

SUMMARY OF THE INVENTION

It is accordingly a primary object of the present invention to provide a camera-radio combination which will avoid the above drawbacks.

In particular, it is an object of the invention to provide a combined camera and radio receiver assembly which is of a magnitude corresponding to that of a relatively small camera, this latter camera having the radio built into the same.

According to the invention the components of the radio receiver are situated in interior spaces of the camera housing which normally would remain empty. Thus, the new construction according to the invention differs basically from the known construction in that new technical principles are involved. While with the known solution the approach has been to maintain the camera structure and receiver structure as entirely separate units situated within a common housing, according to the present invention use is made of interior space of the camera housing which normally would remain empty so that this space is now available for accommodating components of a radio receiver.

According to a particularly preferred embodiment of the invention, the components of the receiver are situated on opposite sides of the optical axis. This type of arrangement provides a uniform use of interior space in a camera where this space is symmetrically situated on both sides of the optical axis.

It has proved to be desirable to situate the radio controls for station selection and amplification control at the exterior of the camera housing such as, for example, at the front wall or end wall thereof in the form of rotary knobs accessible at the exterior of the camera housing.

A particularly favorable distribution of the components of the receiver according to the invention provides for situating a printed circuit plate in the interior of the camera housing with this plate having an opening through which the optical axis passes as well as opening for the loudspeaker magnets, the printed circuit plate being situated in the interior of the housing adjacent the front wall thereof with this printed circuit plate extending substantially parallel to the film plane so that it becomes possible to use the entire width of the camera for the purpose of accommodating the printed circuit plate.

The camera has rearwardly of its front wall film spool chambers, and between these chambers and the front wall of the camera as well as between the opposed side wall thereof there are relatively large spaces capable of accommodating relatively large components of the radio receiver. Thus, these components may be situated at locations where they will not interfere with the travel of light through the objective to the film. Spaces of this type are generally empty in conventional cameras and thus are capable of receiving those receiver components which have the greatest size.

According to a further feature of the invention the front wall of the camera housing is provided with openings through which the sound of the receiver can emanate, the membrane of the loudspeaker being situated directly behind these front wall openings of the camera.

Since the radio requires a source of current, this source of current takes the form, in accordance with a further feature of the invention, of the source of current which in any event is required for operating the flash apparatus of the camera.

Where the camera has an electrically controlled shutter, a source of current is also required, and in this case the same source of current which is used to actuate the camera shutter is also used for the radio.

In addition to the above adjusting components accessible at the exterior of the camera housing for station selection and sound amplification, it is also possible to provide adjustment of the radio receiver operation by way of a rotary ring which surrounds the objective concentrically at the front of the camera. Such a ring can have extensions projecting into the interior of the camera housing and operatively connected with radio components which can be controlled by turning of the ring. With such an arrangement it is possible to provide a camera housing which does not differ in any practical way from a conventional camera housing.

These extensions which extend into the housing from the rotary adjusting ring may have teeth meshing with teeth on the elements to be adjusted.

BRIEF DESCRIPTION OF DRAWINGS

The invention is illustrated by way of example in the accompanying drawing which forms part of this application and in which.

DESCRIPTION OF THE PREFERRED EMBODIMENTS

Figure 1:
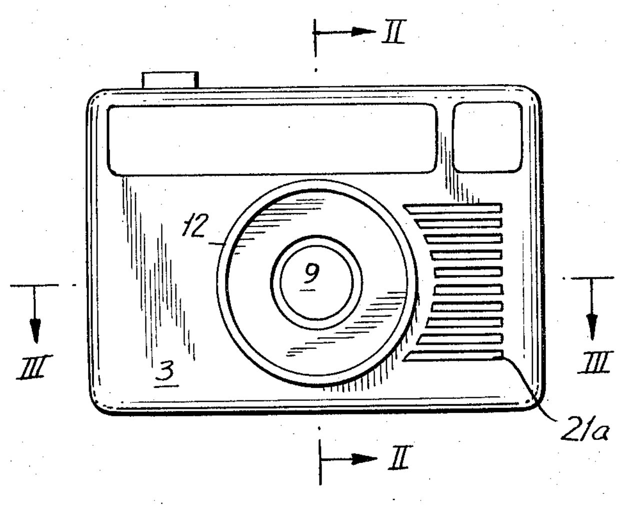
FIG. 1 is a schematic front elevation of a camera-radio combination according to the invention.

Referring to the drawings, it will be seen that the camera housing 1 has a rear wall 2 and a front wall 3. The camera housing 1 is provided in its interior with the film spool chambers 4 and 5, these chambers being situated on opposite sides of a centrally arranged light-guiding tube 6 through which light which travels through the camera objective continues to travel along the optical axis to the film plane. This light-guide tube 6 is formed at its front end with a diaphragm or exposure opening 7. In front of the latter exposure aperture 7 is located the assembly of shutter blades 8 of the shutter 10 which is only schematically illustrated, so that these blades 8 can turn in front of the aperture 7. The front wall 3 carries the objective 9 behind which there is located a front light-guiding tube 11 for guiding the light rays along the optical axis. The objective 9 is held by the tube 11 as well as an exterior ring 12 at the front wall 3.

In the interior of the camera housing 1 there is situated, in a plane parallel to the front wall 3 of the camera housing, a printed circuit plate 13 having mounted thereon electronic components 14. The printed circuit plate 13 is formed approximately at its center with an opening 15 through which the optical axis passes, and in which the inner end of the light-guide tube 11 is located, so that the light rays can travel along the optical axis to the film plane without any interference from the radio components. At the region of the side walls 16 and 17 of the camera housing are located the sound amplification control knob 18 and the station selector knob 19. These manually turnable knobs thus extend to the exterior of the camera housing so as to be turnable at the exterior thereof. The loudspeaker membrane 20 is situated directly next to the slots 21a which are formed in the front wall of the camera housing, while the loudspeaker magnet 21 extends through an opening in the printed circuit plate 13 and is situated in the free space 22 in the camera housing. This relatively large free space 22, which normally would remain empty, is defined by the side wall 16, the film spool chamber 4, and the light-guiding tube 6. The space 22 corresponds to an opposed space 23 situated in the camera housing.

Figure 2:
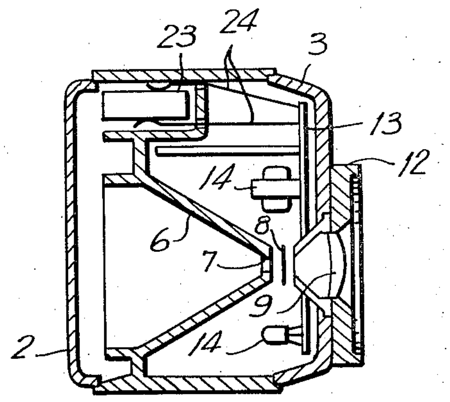
FIG. 2 is a schematic sectional elevation taken along line II—II of FIG. 1 in the direction of the arrows.
Figure 3:
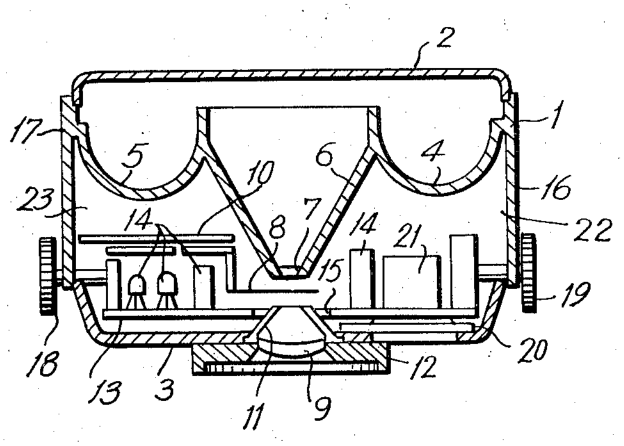
FIG. 3 is a sectional plan view taken along line III—III of FIG. 1 in the direction of the arrows.
Figure 4:
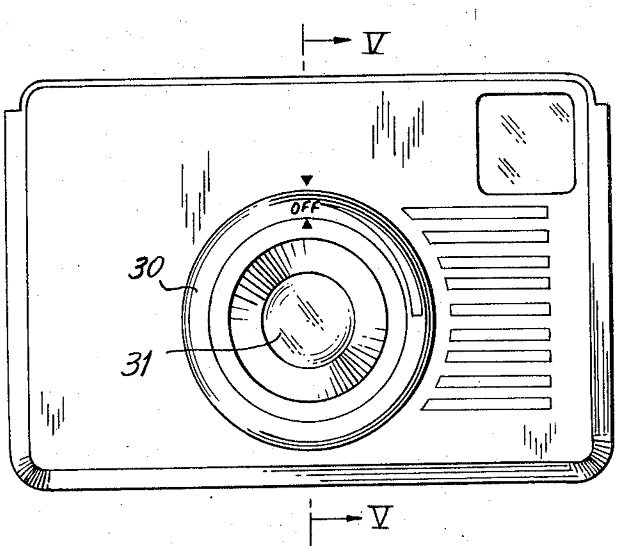
FIG. 4 is a schematic front elevation of a front wall with the top removed in a camera-radio combination according to another embodiment of the invention.
Figure 5:
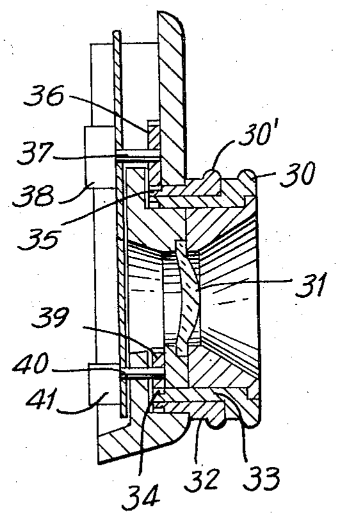
FIG. 5 is a schematic sectional elevation taken along line V—V of FIG. 4 in the direction of the arrows.
Figure 6:
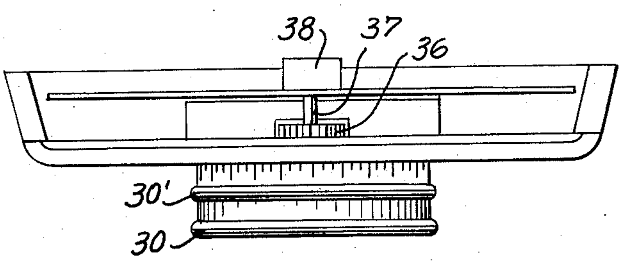
FIG. 6 is a plan view of the structure of FIG. 44.

In the example shown in FIGS. 1-3 the ring 12 is fixed to the front wall 3 of the camera housing. However, referring now to FIGS. 4 – 6 it is shown that such a ring 30, 30′ can also be supported for rotary movement, concentrically around the objective 31, and can have extensions 32, 33 projecting into the interior of the camera housing and serving as actuating elements for station selection and control of the volume of the sound. Such a turnable ring, can, for example, be provided at its rear with gear sectors 34, 35 which mesh with a gear 36 situated on the shaft 37 of the element 38 which adjusts the volume of the sound or with the gear 39 situated on the shaft 40 of the element 41 which selects the broadcasting station which is received.

The supply of electricity for the camera as well as the radio takes the form of a battery 23 which is electrically connected through conductors 24 (FIG. 2) with the printed circuit plate 13.

What is claimed is:

1. A camera-radio combination comprising a camera having a housing in which there are spaces not occupied by camera components and which would normally remain empty, and a radio receiver carried by said camera housing and having at least tuning and sound-controlling components situated in said spaces, so that said camera housing also serves as a radio housing, and wherein said camera housing carries an objective for directing light rays along a predetermined optical axis, and the receiver components being situated in spaces located on opposite sides of said axis, and wherein the camera housing has a front wall, said receiver including a printed circuit plate situated in said housing adjacent said front wall and formed with an opening through which the optical axis passes so that the light rays can travel through the latter opening.

2. The combination of claim 1 and wherein said receiver includes manually turnable elements for station selection and control of sound amplitude, said elements being situated at the exterior of said housing.

3. The combination of claim 1 and wherein said printed circuit plate is situated in a plane which is substantially parallel to the film plane of the camera.

4. The combination of claim 1 and wherein the camera housing has in its interior film spool chambers spaced rearwardly from a front wall of the camera housing, the latter having a pair of opposed side walls extending rearwardly from said front wall, and said side walls, front wall, and film spool chambers defining in the interior of the camera housing spaces occupied by the largest components of said receiver.

5. The combination of claim 1 and wherein said receiver has a loudspeaker membrane, said housing having a front wall formed with opening behind which said membrane is situated.

6. The combination of claim 1 and wherein said camera includes a flash means, and a source of current carried by said camera housing and being common to said flash means and said receiver.

7. A camera-radio combination comprising a camera having a housing in which there are spaces not occupied by camera components and which would normally remain empty, and a radio receiver carried by said camera housing and having components situated in said spaces the camera including an electrically operable shutter, said housing carrying a source of current which is common to said receiver and said shutter.

8. A camera-radio combination comprising a camera having a housing in which there are spaces not occupied by camera components and which would normally remain empty, and a radio receiver carried by said camera housing and having at least tuning and sound-controlling components situated in said spaces, so that said camera housing also serves as a radio housing; the camera including an objective, and said receiver including an annular turnable control element surrounding said objective and being concentrically arranged with respect thereto.

9. The combination of claim 8 and wherein said element has extensions projecting into the interior of the camera housing and said receiver having components operatively connected with said extensions to be controlled thereby.

10. The combination of claim 9 and wherein said extensions have teeth and the components of said receiver which are controlled by said element having teeth meshing with the teeth of said extensions of said element.

* * * * *